United States Patent
Gestri

(10) Patent No.: US 11,454,201 B2
(45) Date of Patent: Sep. 27, 2022

(54) APPARATUS AND METHOD FOR TESTING A FUEL INJECTOR NOZZLE

(71) Applicant: Vitesco Technologies GmbH, Hannover (DE)

(72) Inventor: Luca Gestri, Cascina (IT)

(73) Assignee: Vitesco Technologies GmbH, Hannover (DE)

( * ) Notice: Subject to any disclaimer, the term of this patent is extended or adjusted under 35 U.S.C. 154(b) by 179 days.

(21) Appl. No.: 16/811,904

(22) Filed: Mar. 6, 2020

(65) Prior Publication Data

US 2020/0208598 A1 Jul. 2, 2020

Related U.S. Application Data

(63) Continuation of application No. PCT/EP2018/073959, filed on Sep. 6, 2018.

(30) Foreign Application Priority Data

Sep. 13, 2017 (EP) ..................................... 17190906

(51) Int. Cl.
*F02M 65/00* (2006.01)
*G01L 5/00* (2006.01)

(52) U.S. Cl.
CPC ........... *F02M 65/00* (2013.01); *G01L 5/0052* (2013.01)

(58) Field of Classification Search
CPC ....... F02M 65/00; G01L 5/0052; G01M 15/04
See application file for complete search history.

(56) References Cited

U.S. PATENT DOCUMENTS 5,753,806 A * 5/1998 Ryan, III ................ F02D 41/28
                                                          239/74
6,508,112 B1 * 1/2003 Verhoeven ............ G01L 5/0052
                                                          73/114.46

(Continued)

FOREIGN PATENT DOCUMENTS

CN          201288628 Y      8/2009
DE          3316581 C1      10/1984
(Continued)

OTHER PUBLICATIONS

European Search Report dated Jan. 31, 2018 from corresponding European Patent Application No. EP 17190906.2.
(Continued)

*Primary Examiner* — Freddie Kirkland, III

(57) ABSTRACT

An apparatus and a method for testing a fuel injector nozzle with a tip having at least one fuel outlet are provided. The apparatus comprises a test chamber, a holder for holding the fuel injector nozzle such that the outlet is within the test chamber, a fuel supply arrangement for supplying fuel to the fuel injector nozzle, a sensor having a sensor surface for sensing an atomized fuel spray supplied by the fuel injector nozzle through the fuel outlet and movement module for moving the sensor. The movement module is configured to position the sensor surface of the sensor at a plurality of positions corresponding to a surface of a sphere having a radius R and a center point C adjustable to match a center point $c_t$ of the tip of the fuel injector nozzle or a center point $c_f$ of an orifice of the fuel outlet.

14 Claims, 5 Drawing Sheets

(56) References Cited

U.S. PATENT DOCUMENTS

| | | | | |
|---|---|---|---|---|
| 6,915,683 | B2* | 7/2005 | Schoeffel | F02M 65/001 73/114.45 |
| 6,962,070 | B1* | 11/2005 | Tanner | G01L 5/0052 73/12.07 |
| 7,171,847 | B2* | 2/2007 | Kuhn | F02M 65/001 73/114.48 |
| 7,197,918 | B2* | 4/2007 | Shen | F02M 65/00 73/114.51 |
| 7,409,858 | B2* | 8/2008 | Dria | G01F 1/6884 73/152.33 |
| 8,166,807 | B2* | 5/2012 | Greeves | F02M 65/001 73/114.45 |
| 9,170,141 | B2* | 10/2015 | Lee | G01F 1/76 |
| 9,429,125 | B2* | 8/2016 | Mori | F02M 65/00 |
| 10,890,427 | B2* | 1/2021 | Haremaki | B08B 9/0495 |
| 2005/0241367 | A1* | 11/2005 | Tanner | G01L 5/0052 73/12.07 |
| 2007/0125163 | A1* | 6/2007 | Dria | E21B 17/206 73/152.18 |
| 2010/0170329 | A1* | 7/2010 | Greeves | F02M 65/001 73/114.45 |
| 2014/0290335 | A1* | 10/2014 | Shanks | E21B 47/135 73/25.05 |

FOREIGN PATENT DOCUMENTS

| | | |
|---|---|---|
| EP | 3009664 A | 4/2016 |
| JP | H0949471 A | 2/1997 |
| JP | H1090124 A | 4/1998 |
| JP | H11352021 A | 12/1999 |
| WO | 2013/093328 A1 | 6/2013 |
| WO | 2015/051958 A1 | 4/2015 |

OTHER PUBLICATIONS

International Search Report and Written Opinion dated Oct. 9, 2018 from corresponding International Patent Application No. PCT/EP2018/073959.

Chinese Office Action dated May 27, 2021 for corresponding Patent Application No. 201880059790. 7.

\* cited by examiner

APPARATUS AND METHOD FOR TESTING A FUEL INJECTOR NOZZLE

CROSS REFERENCE TO RELATED APPLICATIONS

This application is a Continuation of PCT International Application No. PCT/EP2018/073959, filed Sep. 6, 2018, which claims priority to European Patent Application No. 17190906.2, filed Sep. 13, 2017, wherein the contents of such applications are incorporated herein by reference.

TECHNICAL FIELD

Apparatus and methods for testing a fuel injector nozzle, in particular a gasoline direct fuel injector nozzle.

TECHNICAL BACKGROUND

Gasoline direct fuel injectors are used to deliver atomised fuel directly into the combustion chamber of an internal combustion engine. In particular, it is desirable that the atomised fuel has a spray architecture suitable for achieving good combustion within the chamber. Several spray characteristics may be used to verify and improve the spray generated by the nozzle, for example through the variation of seat and holes design parameters in the case of Multi-Stream Injectors (MSI), or the needle and cartridge profile dimensions in the case of Outward Opening Injectors (OOI).

Patternation provides the information about the distribution of the atomized fuel spray supplied by the injector nozzle. From the patternation of the spray, it is possible to derive the location of the centroids of the jets or outlets in the case of Multi-Stream Injectors or the mean line loci in the case of Outward Opening Injectors. Patternation may be performed by collecting the jet's liquid fraction using an array of cells or by acquisition with Mie scattering of a horizontal laser cut or by light extinction tomography, for example. However, all of these methods have limitations.

The collection of the liquid fraction of the jet fuel by the use of cells is limited in resolution by the dimensions of the cells. Furthermore, liquid splashing and/or aerodynamic interaction of the droplets with the borders of the cells may increase the uncertainty in the measurement and the spray intended to be characterised. The accuracy of the collection also depends on the angular elevation of the jet with respect to the axis of the injector which may vary significantly in the case of side engine mounting applications. Increase of the fuel pressure may also lead to unacceptable errors in the measurement of the distribution because of the higher atomisation and the increase of splashing effects.

Laser sheet/light extinction cuts may have a higher resolution, but an increase in fuel pressure can lead to obscuration of the light or local scattering for some parts of the jet's contour when attempting to recover the lack of signal. Additionally, when increasing fuel pressure from 25 MPa to 50 MPa, the spray density increases progressively which can lead to an unacceptable obscuration of the transmission signal even with the use of powerful lasers.

EP 3 009 664 A1 discloses a measurement device and measurement method for measuring a flow distribution of liquid spray stream that has been atomised by a nozzle. The measurement device includes at least one sensing wire which is movable. The wire is heated by applying an electric current to the wire. As the liquid spray flows past the wire, the wire cools and its resistance decreases as enabling the mass of the liquid spray flowing past the wire to be determined by the change in resistance of the wire. The temporal evaluation of the liquid spray stream is also possible.

DETAILED DESCRIPTION

Figure 1:
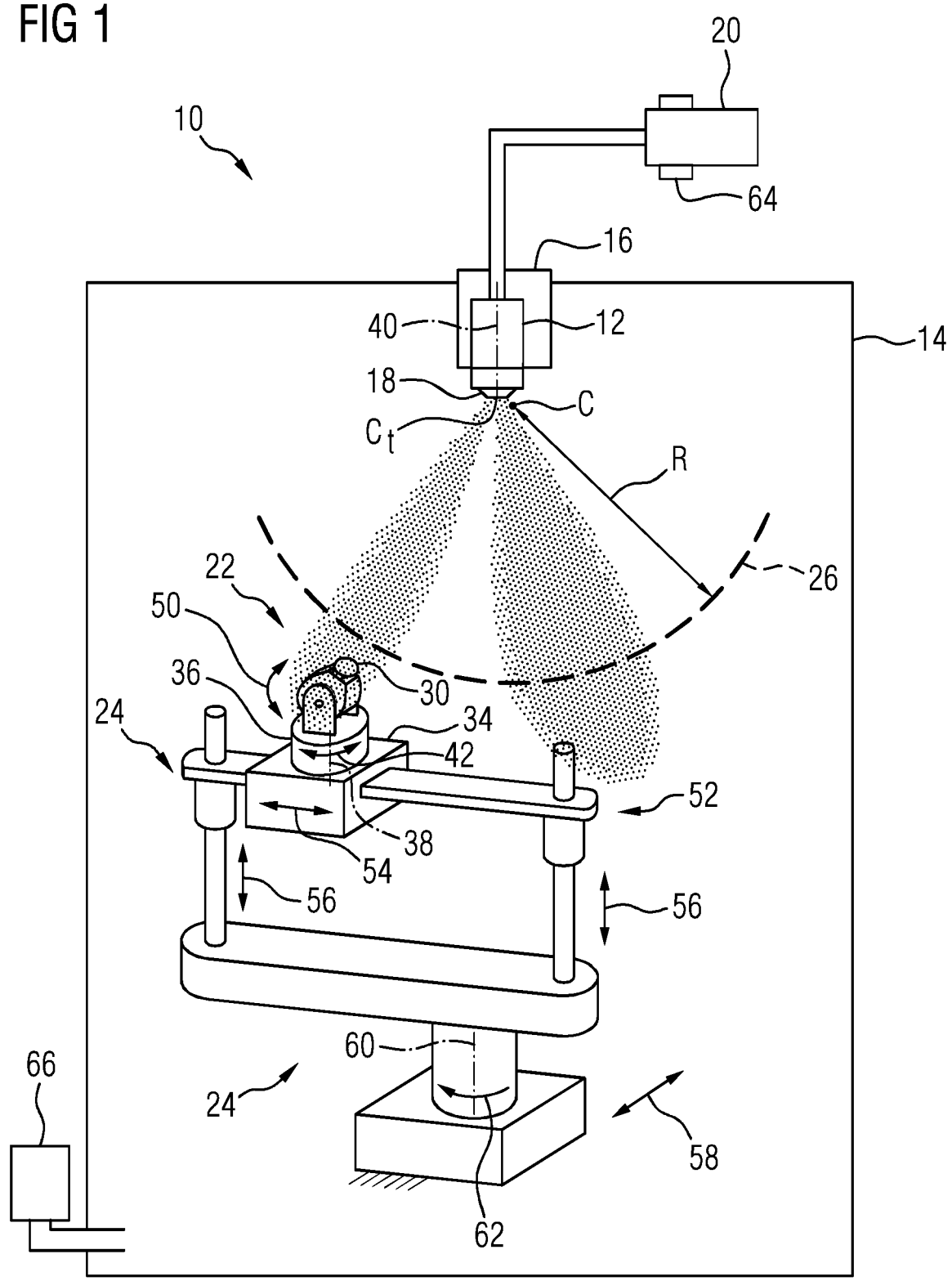
FIG. 1 illustrates apparatus for testing a fuel injector nozzle.

An apparatus and a method for testing a fuel injector nozzle with which a particularly reliable measurement of the patternation can be obtained, also for higher fuel pressures.

An apparatus for testing a fuel injector nozzle is disclosed. The fuel injector nozzle has a tip with at least one fuel outlet. The fuel outlet has at least one orifice. The tip has a center point $c_t$.

The apparatus comprises a test chamber, a holder for holding the fuel injector nozzle such that the fuel outlet of the fuel injector nozzle is within the test chamber, a fuel supply arrangement for supplying fuel to the fuel injector nozzle, a sensor having a sensor surface for sensing an atomized fuel spray supplied by the fuel injector nozzle through the fuel outlet and a movement module for moving the sensor. In one embodiment, the apparatus also comprises the fuel injector nozzle.

The movement module is configured to position the sensor surface of the sensor at a plurality of positions corresponding to a surface of a sphere having a radius R and a center point C that is arranged at the tip of the fuel injector nozzle. The position of the center point C of the sphere may be adjusted so that it is matched to the center point $c_t$ of the tip of the fuel injector nozzle or a center point $c_f$ of an orifice of the fuel outlet.

The sensor is movable about the test chamber such that the sensor surface is positionable at a plurality of positions corresponding to a surface of a sphere having a radius R, wherein the fuel injector nozzle is arranged at the center point C of the sphere. The center point $c_t$ of the tip of the fuel injector nozzle or the center point $c_f$ of an orifice of the fuel outlet may be positioned at the center point C of the sphere.

The sensor is, therefore, not in a fixed and immovable relationship to the fuel injector nozzle and the outlet(s) of the fuel injector nozzle as is the case for a cell array measuring system, for example. Furthermore, by positioning the sensor surface at a plurality of positions corresponding to a surface of a sphere, a spherical distribution of the dynamic force of the atomized fuel sprayed by the fuel injector nozzle can be obtained.

The plurality of positions at which the sensor, for instance the sensor surface, is positioned may be equidistant or at least quasi equidistant at the surface of the sphere. The distance between adjacent positions of the plurality of positions at the surface of the sphere is a length of an arc. Consequently, the plurality of positions are equidistantly spaced by a length corresponding to the length of the arc. The same length of the arc may be used so that the fuel distribution map obtained has a spatially uniform density of measurement points. By using the same length of the arc for maps obtained for different fuel injector nozzles or different outlets of a single fuel injector nozzle, the fuel distribution maps can be more reliably compared.

The position of the sphere may be adjusted so that the center point C of the sphere is arranged at the tip of the fuel injector nozzle. This enables the sensor and the sensor surface to be positioned at a plurality of positions on the surface of a sphere that is centered on the tip of the fuel injector nozzle. Consequently, any spatial difference between the position of the fuel nozzle with respect to the center point C of the sphere over whose surface the sensor and sensor surface are moved may be compensated.

For example, to produce a fuel distribution map, the center point C of the sphere may be positioned such that it matches the center point $c_t$ of the tip of the fuel injector nozzle. In this way, the position of the sensor and the sensor surface with respect to the center point $c_t$ of the tip of the fuel injector nozzle is adjusted so that the sensor surface is positioned equidistantly from the center point $c_t$ of the tip of the fuel injector nozzle in the direction of the radius R of the sphere, as the sensor surface is arranged at several positions at the surface of the sphere to produce the fuel distribution map. The positions of the sensor surface at the surface of the sphere may also be mutually equidistant.

In another example, the position of the center point C of the sphere may be adjusted so that it is matched to a center point $c_f$ of an orifice of the fuel outlet so that so that the sensor surface is positioned equidistantly from the center point $c_f$ of the orifice of the fuel outlet in the direction of the radius R of the sphere to produce the fuel distribution map. The positions of the sensor surface at the surface of the sphere may also be mutually equidistant.

In another example, the position of the center point $c_t$ of the tip of the fuel injector nozzle may be adjusted so that it matches the center point C of the sphere. In another example, the position of the center point $c_f$ of the orifice of the fuel outlet may be adjusted so that it matches the center point C of the sphere.

The fuel distribution map may include a centroid corresponding to the axis of the outlet of the fuel injector nozzle. This centroid represents the position at which the maximum dynamic force of the fuel is expected. The plurality of points at which the sensor means is positioned to obtain the fuel distribution map may be centered on the centroid.

In some embodiments, the relationship between the distribution of the atomized fuel sprayed by one or more individual outlets of the fuel injector nozzle and the centroid or mean line loci of the outlet is measured. The results obtained may be used to form a spherical fuel distribution map, that is a fuel distribution map over a spherical surface rather than a planar surface. These results may be used to improve the position of the fuel injector nozzle or outlets within the combustion chamber in order to achieve more complete combustion, for example.

In some embodiments, the fuel injector nozzle may be tested using a fluid other than a fuel.

In some embodiments, the sensor is positionable at a plurality of positions corresponding to a surface of a sphere having a radius R such that the sensor surface is positioned at a tangent to the sphere. In other words, the sensor surface is positionable so that is arranged tangentially to the (imaginary) sphere at each of the plurality of the positions.

In order to achieve this, the movement module may be configured to rotate the sensor and/or sensor surface around a first rotational axis, wherein the first rotational axis is substantially parallel to a longitudinal axis of the fuel injector nozzle, and/or rotate the sensor and/or sensor surface around a second rotational axis, wherein the second rotational axis is orthogonal to the first rotational axis. The movement module may also be configured to move the sensor means in three orthogonal linear or translational directions.

The movement module may comprise one or more units or submodules for moving the sensor and sensor surface. The movement module may comprise one or more units or submodules for rotating the sensor means around a first rotational axis, wherein the first rotational axis is substantially parallel to a longitudinal axis of the fuel injector nozzle, and/or means for rotating the sensor means around a second rotational axis, wherein the second rotational axis is orthogonal to the first rotational axis. The movement module may also include a unit or submodule for moving the sensor means in three orthogonal linear or translational directions.

In some embodiments, the sensor is mounted on a submount which is capable of rotating the sensor surface around the first and second rotational axes and the submount is mounted on a further mount which is capable of moving the submount and, therefore, the sensor, in three orthogonal linear or translational directions. The movement of the submount may be used to position the sensor head or sensor surface at a tangent to the surface of the sphere.

In some embodiments, the movement module may be configured to move and position the sensor surface at positions corresponding to a half sphere with the fuel injector nozzle arranged at the center of the half sphere.

In some embodiments, the movement module is configured to move and position the sensor, for instance the sensor surface, at a plurality of points that are equidistant to one another along the surface of the sphere. The equidistant points lie along an arc and have an arc length between neighbouring points. This may be used in order to obtain a fuel distribution map of an area corresponding to a portion of the surface of the sphere, which has a uniform density of measurement points over the measured area. The distance between adjacent points is the length of an arc having a radius R.

The sensor may comprise a force sensor. The force sensor is in operable to measure a force of the fuel spray on the sensor surface. More precisely, the force is optionally the force of that portion of the fuel spray which impinges on the sensor surface when the force sensor is operated to measure the force.

The force sensor may include a head or plate coupled to a pin. The head or plate may expediently provide the sensor surface in this embodiment. As fuel impinges on the plate, the pin is displaced along it's longitudinal axis. The movement of the pin corresponds to the dynamic pressure of the atomized fuel spray. The head may be positionable at positions corresponding to a tangent of the sphere and the pin at positions corresponding to a radius of the sphere, i.e. perpendicularly to the sphere of the sphere, in order to measure a spherical fuel distribution map.

The sensor may comprise a force sensor which may be configured to sensing a force of the fuel spray at a frequency of at least 10 kHz. High frequency sampling of the fuel jet may be used to investigate flow stability, particularly if the sensor surface is positioned at a small distance from the tip of the fuel nozzle so that the aerodynamic forces have a reduced effect on the measurement.

The fuel supply arrangement of the apparatus may comprise a module for adjusting the pressure of the fuel or other fluid supplied to the fuel injector nozzle. This feature enables the patternation of the fuel injector nozzle and in particular for each outlet of the fuel injector nozzle to be measured at several different fuel pressures to enable a more thorough testing of the profile of the outlet(s). In combination with the use of a force sensor as the sensor, a more spatially accurate patternation measurement can be obtained. The dynamic pressure developed by the spray at a particular position can also be assessed by measuring the force of the spray during a known number of injections of fuel.

A method for testing a fuel injector nozzle is also disclosed. The method comprises placing a fuel injector nozzle having a tip with at least one fuel outlet into a test chamber, spraying atomized fluid into the test chamber from the at least one outlet of the fuel injector nozzle and detecting the atomized fluid spray at a plurality of positions corresponding to positions of a surface of a sphere having a radius R and a center point arranged at a center point of the tip of the fuel injector nozzle or at a center point of an orifice of the outlet. The fluid may be fuel, for example the type of fuel with which the fuel injector nozzle is designed to inject.

The method may be used for measuring the atomized fuel spray supplied by a Multi-Stream Injector (MSI) or an Outward Opening Injector (OOI). Characteristics of the measured atomized spray may be used to improve the spray generated, for example through the variation of seat and holes design parameters in the case of Multi-Stream Injectors (MSI), or the needle and cartridge profile dimensions in the case of Outward Opening Injectors (OOI).

In some embodiments, the atomized fluid spray is detected using a sensor and the sensor is positioned at a plurality of the positions on the surface of the sphere corresponding to an equidistant or at least a quasi equidistant map of interrogation points. The interrogation points may be—at least substantially—equidistant. The sensor may be used to obtain a spherical map of the fuel distribution. In particular, the sensor may include a sensor surface that is positioned at the plurality of positions on the surface of the sphere so that the sensor surface is positioned at a tangent to the sphere at each of the positions. Since the surface over which the sensor surface is positioned is spherical, the distance between adjacent positions is the length of an arc, and the length of the arc has the same length between adjacent positions so that the positions are equidistant.

The fuel sensor may include a head or plate and a pin arrangement and measure the force of the fuel impinging the plate by measuring the movement of the pin.

In some embodiments, the fuel sensor is positioned at equidistant positions over the surface of the sphere, a value corresponding to a parameter of the fuel spray is obtained at each position and an outlet distribution map is formed from the values.

The radius of the sphere may be adjusted to R', which is different from the radius R, and the sensor positioned at equidistant positions on the surface of this sphere having the radius R' and the center point C. A value corresponding to force of the fluid spray from a particular outlet is obtained at each position and an outlet distribution map is formed from the values at two or more values of the radius, for example R and R'.

The spray may be detected by a force sensor and the force of a single pulse of fuel may be measured over at a plurality of time values over the length of the pulse. That means in particular that the parameter of the fuel spray is obtained at each position is obtained by measuring the force of the fuel spray on the force sensor at the corresponding position. The force in particular corresponds to the dynamic pressure of the fuel spray.

In some embodiments, the method further comprises measuring the force of a plume of atomized fluid from a first outlet of the fuel injector nozzle at a plurality of first equidistant positions corresponding to the surface of the sphere at the radius R, the plurality of first equidistant positions forming a test map, determining the sensed center of the plume, comparing the sensed center of the plume in the test map to an expected center of the plume, determining a difference between the sensed center of the plume and the expected center of the plume and, if a difference between the sensed center of the plume and the expected center of the plume is greater than a pre-determined threshold value, adjusting the orientation of the test map with respect to the fuel injector nozzle such that the position of the sensed center of the plume corresponds to the expected center of the plume in the test map.

This method may be used to perform a calibration, in particular an angular calibration to compensate for any difference in the position of the fuel injector nozzle in the test chamber with respect to the ideal or desired position. The angular calibration procedure may include a preliminary assessment of the force distribution produced by the interaction of a single jet with the force sensor using a high-resolution spacing at a distance of around 5 to 7 mm from the tip. This calibration method may be used for a single outlet or orifice and, after the test map for all of the outlets or orifices, respectively, is repositioned to compensate for any angular misalignment, a fuel distribution map for each of the outlets or orifices, respectively, may be obtained. A small distance between the outlet and the sensor may be used to eliminate or reduce any aerodynamic and/or fluid dynamic effects and allow a more accurate determination of the sensed center of the plume or centroid for that outlet.

The angular orientation of the test map, which includes the test points on the surface of the sphere, with respect to the fuel injector nozzle is adjusted such that the sensed center of the plume corresponds to the expected center of the plume. In some embodiments, the position of the centroid is put in relationship with the seat hole geometry and a rigid rotation around the seat axis is performed, for example for each of the knots, i.e. equidistantly arranged points on the surface of the sphere, in the areas of interest.

The plurality of first positions are mutually spaced apart by a first arc length, i.e. distance between immediately adjacent positions on the surface of the sphere. The method may further comprise detecting the fluid spray at a plurality of second positions corresponding to positions of a surface of a sphere having a radius R, the plurality of second positions being mutually spaced apart by a second arc length which is smaller than the first arc length. This enables the fuel distribution to be determined in more spatial detail and reduces testing time for the calibration stage.

The fluid or fuel supplied to the fuel injector may have a first pressure. The method may further comprise adjusting the pressure of the fluid or fuel supplied to the fuel injector to a second pressure that this different from the first pressure and detecting the fuel spray at a plurality of positions corresponding to positions of a surface of a sphere having a radius R when the fuel injector is supplied with the fluid or fuel at the second pressure. The pressure of the fuel supply may be varied between 10 MPa and 60 MPa, for example, the limit being included. This embodiment may be used to investigate the effect of the fluid or fuel supply pressure on the spray pattern for each injector outlet.

To summarise, it is possible to perform a very high resolution spray pattern assessment at several distances from the injector's tip. Spray jet distributions can be assessed in a reliable way with fuel pressures of up to 50 MPa, for example. Spherical maps may be optimised taking only the points related to the areas of interest into consideration that are defined using the actual hole position, due to the assessment of the vertical position of the tip and the angular calibration procedure.

The risk of introducing artefacts into the distribution due to the issue of splashing at high fuel pressure is removed, since an array of sensors such as cells at a fixed radius or distance is not used. Consequently, centroid detection and calculation can be successfully performed also for compact sprays and the attribution of the centroids to each hole can be done automatically. Since patternation is performed along the points of the spherical map with the pin face oriented at a tangent to the sphere, the distribution of the force with the displacement is evaluated in the same way for each jet. In contrast to planar patternation, spherical patternation including the calibration phase allows a complete comparison of the seat's jets in the case of the multi-stream injector or of different portions of the spray sheet in the case of an outward opening injector. Variation of the peak forces and the type of distribution can be related to the potential penetration and liquid concentration of each spray jet or outlet or spray distribution or sheet and related to the nozzle profile.

Referring to the Figures, FIG. 1 illustrates apparatus 10 for testing a fuel injector nozzle 12. The apparatus 10 includes a test chamber 14 and a holder 16 for holding the fuel injector nozzle 12 such that the one or more fuel outlets 18 of the fuel injector nozzle 12 are positioned within the test chamber 14. The fuel injector 12 has a tip which is positioned within the test chamber at a position $c_t$. The apparatus also includes a fuel supply arrangement 20 for supplying fuel to the fuel injector nozzle 12. The test apparatus 10 further includes a sensor 22 for sensing fuel spray supplied by the fuel injector nozzle 12 which has been atomized by passage through at least one fuel outlet 18 and a movement module 24 for moving the sensor 22 within the test chamber 14. The fuel injector nozzle 12 may be a Multi-Stream Injector (MSI) or an Outward Opening Injector (OOI), for example for international combustion engines using gasoline direct fuel injection.

The movement module 24 is configured such that the sensor 22, in particular a sensor surface of the sensor 22, is positionable at a plurality of positions corresponding to a surface of a sphere 26, indicated schematically in FIG. 1 by the dotted line, having a radius R and a center point C arranged at the tip of the fuel injector nozzle 12. The center point C of the sphere 26 may be located at a center point $c_t$ of the tip of the fuel injector nozzle 12 or at a center point $c_f$ of an orifice of the fuel outlet 18.

As an example, the movement module 24 may include 5 degrees of freedom in order to suitably position the sensor surface at a variety of positions corresponding to the surface of the sphere 26. The positions may be equidistant from one another at the surface of the sphere 26. Adjacent positions are spaced apart by an arc length due to the spherical surface so that a spatially uniform spherical pattern can be obtained. Additionally, the sensor 22, in particular the sensor surface, is positionable by the movement module 24 at a tangent to the sphere 26 at each of these positions.

The sensor 22 collects data representative of one or more parameters of the atomized fuel spray at the same distance from the fuel injector nozzle 12 or outlet 18, since it collects data at positions corresponding to the surface of a sphere 26 that is centered on the tip of the fuel injector nozzle 12 or the outlet 18.

Figure 2:
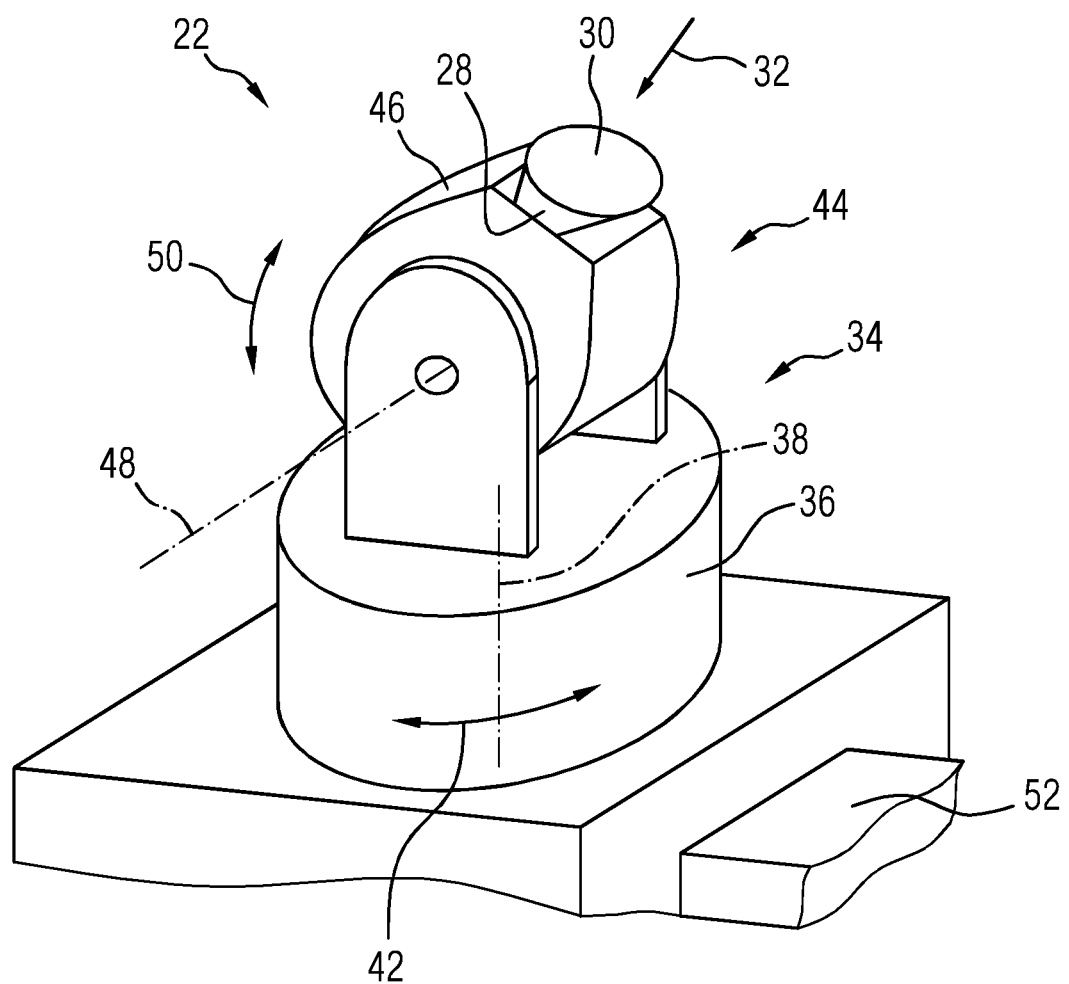
FIG. 2 illustrates a more detailed view of the sensor of the apparatus of FIG. 1.

FIG. 2 illustrates a more detailed view of the sensor 22. The sensor 22 includes a pin 28 providing a force sensor. The pin 28 has a head 30 providing a sensor surface, which is substantially perpendicular to the pin 28, onto which fuel sprayed from the fuel injector nozzle 12, impinges as indicated by arrow 32, producing a force on the pin 28. The force causes the pin 28 to move along its longitudinal axis by a distance. This distance is measured to infer the force of the atomized fuel spray.

The head 30 is positioned within the test chamber 14 at a distance from the fuel injector nozzle 12 which corresponds to the radius R of a sphere 26 centered on the fuel injector nozzle 12. In particular, the pin head 30 of the sensor means 22 is positioned at a plurality of positions arranged at a tangent to the surface of the sphere 26. For example, the pin 28 and head 30 may be positioned at a plurality of positions corresponding to at least one line of latitude and/or at least one line of longitude of the surface of the sphere in order to detect the force of the fuel spray at positions corresponding to a portion of the surface of the sphere 26. Consequently, the force of the fuel spray is determined over a curved surface by suitable movement of the sensor means 22 so that a spherical fuel distribution map can be obtained.

In some embodiments, the sensor 22 includes a submount 34 for the pin 28 and head 30 which includes a base portion 36 which is rotatable around an axis 38, as is indicated in FIGS. 1 and 2 by the arrow 42, which is substantially parallel to the longitudinal axis 40 of the fuel injector nozzle 12. The submount 34 includes a second portion 44 in which the pin 28 is held in a pin holder 46. The pin holder 46 is rotatable about an axis 48 which is substantially orthogonal to the first axis 38 as is indicated in FIGS. 1 and 2 by the arrow 50.

In addition to these two rotational degrees of freedom provided by the submount 34, the submount 34 may be mounted on a mount 52 which is capable of moving the submount 34 in three orthogonal linear or translational directions as indicated schematically in FIG. 1 by the arrows 54, 56 and 58. The mount 52 may also be rotatable around an axis 60 which is substantially parallel to the axis 40 of the fuel injector nozzle as is indicated by the arrow 62.

The movement means 24 may be coupled to a control module for positioning the sensor means at the desired position. The apparatus 10 may also be coupled to an evaluation device (not illustrated) for evaluating the collected values of the force of the fuel or fluid impinging on the head 30 and for processing the collected data to produce a fuel distribution map, in particular a spherical fuel distribution map. The evaluation device may include one or more processors, memory and logic, for example, and may include a suitably programmed computer.

The apparatus 10 may also include a temperature control module 64 for controlling the temperature of the fuel or fluid and of the injector's nozzle 12 and pressure control means 66 for controlling the background pressure of the test chamber 14. The pressure may be adjusted within the range of 0.01 MPa to 1 MPa, for example, the limits being included. The temperature control module 64 and/or the pressure control module 66 may be adjusted so as to more accurately reflect or reproduce the conditions within the combustion chamber in the test chamber 14.

In order to test the fuel injector nozzle 12, a first calibration step may be carried out by carrying out a preliminary assessment of the force distribution produced by the interaction of the atomized jet fuel produced by a single outlet 18 of the fuel injector nozzle 12 with the pin 28 using a larger arc length or resolution, for example, of around 5 mm to 10 mm. From this preliminary force distribution, the position of the centroid of the outlet 18 can be determined and compared to the expected position determined from the known geometry of seat hole. If there is a difference between the measured position of centroid and the expected position known from the seat hold's geometry, a rotation of the test map portion of the sphere 26 around the seat axis may be performed. This repositions each of the positions at the surface of the sphere 26 at which the sensor means 22 will be positioned to test the force distribution of the fuel spray in the main testing step. Each of the positions at which the force is detected may be called a knot.

Figure 3A:
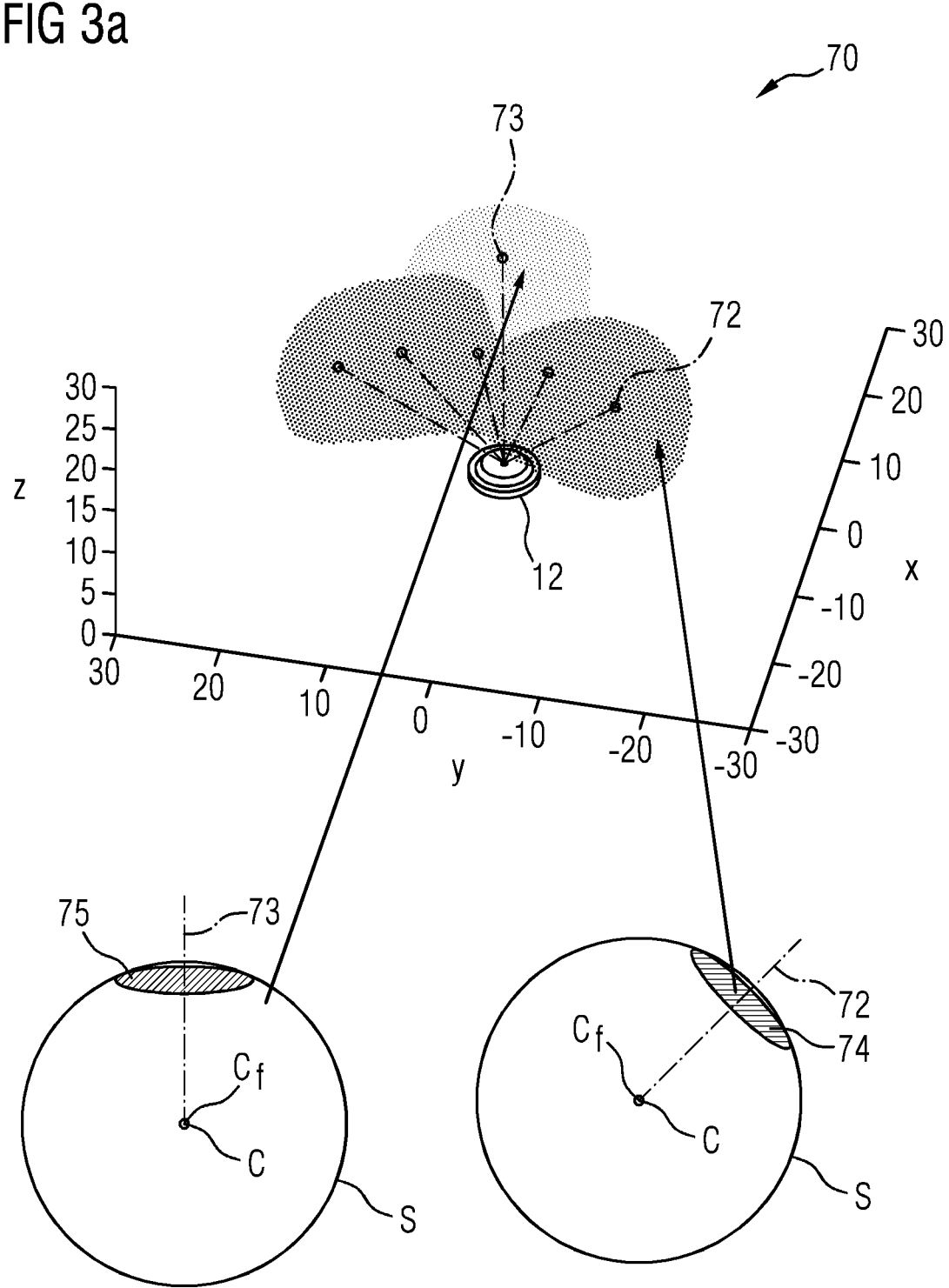
FIG. 3a illustrates a graph of exemplary assessment subsets for individual jets at which data may be collected by the apparatus.
Figure 3B:
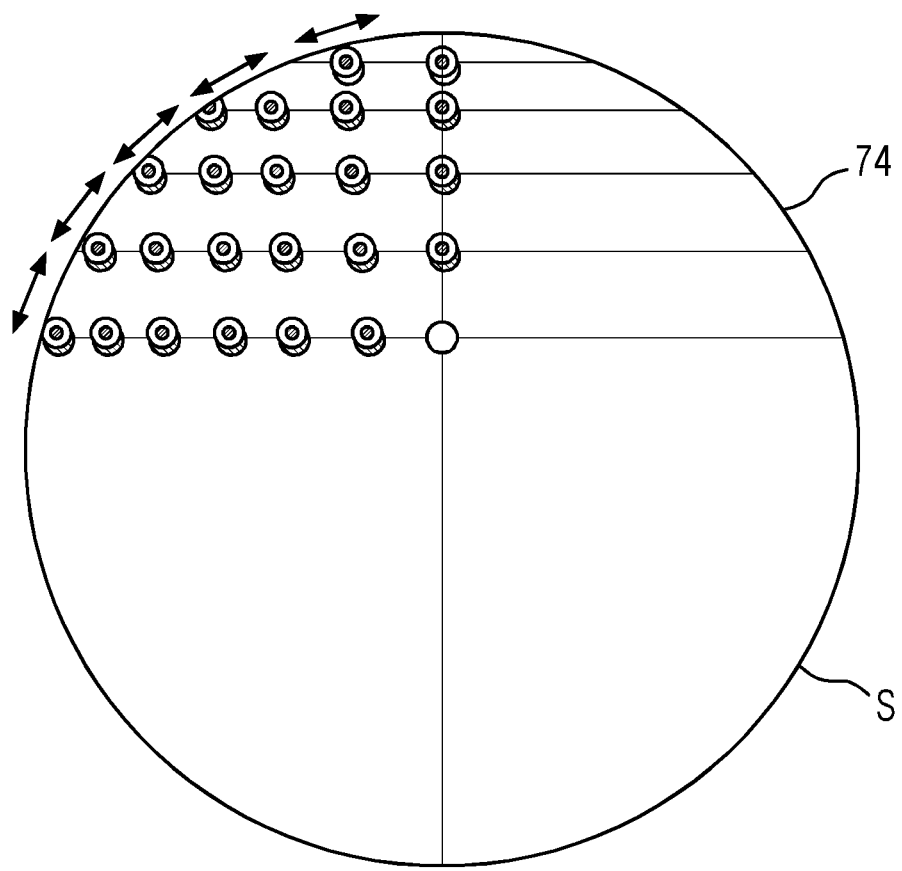
FIG. 3b illustrates a diagram of positions at which data may be collected by the apparatus.

FIG. 3a illustrates a graph of exemplary assessment subsets for individual jets at which data may be collected by the apparatus and FIG. 3b illustrates a diagram of positions at which data may be collected by the apparatus.

The positioning of the knots over the sphere with radius R is built taking the intersection point of the hole's axis with the sphere surface as reference point 72, 73. A meridian passing through this point is selected as reference meridian. The knots over the reference meridian are positioned so that the distance between one knot and the next is equal to the selected unit arc length till all the possible positions are occupied. Over each parallel passing through the knots of the reference meridian, additional knots are placed starting from the reference one, each of them are at a reciprocal distance that is equal to the selected unit arc length till the saturation of the available space over the circumference of that parallel, as illustrated in FIG. 3b. A subset of the knots lying within the spherical cap of pertinence of the selected hole are defined as the assessment points for the jet generated by the selected hole. The same procedure is repeated for all the holes of the spray nozzle 12.

The initial calibration procedure can compensate for any physical misalignment of the fuel injector nozzle 12 within the test chamber 14 including vertical position of the tip of the fuel injector nozzle 12 as well as its angular position. This enables the physical repositioning of the fuel injector nozzle 12 to be avoided which may save testing time and provide more accurate results.

After the initial calibration procedure, one or more areas of interest may be defined and the sensor means 22 positioned at a plurality of positions corresponding to the surface of the sphere 26 with a smaller pitch or higher resolution, for example 0.2 mm. For example, an area of interest could be around the interception points of the geometrical axis of the seat for each of the outlets with the sphere 26, in the case of the multi-stream inject fuel injector, or around the interception curve between the seat cone of the cartridge with the sphere 26 in the case of an outward opening injector.

The sensor 22 may also be capable of high frequency force sampling, for example at frequencies of greater than 10 kHz and may be used to assess the dynamic pressure developed by the fuel injector nozzle 12 at selected points or areas of the spherical map during a fixed number of injections. From the average force applied to the pin 28 by the fuel spray at each point, a spherical plot of the relative distribution and intensity of the fuel spray can be attained.

Figure 4:
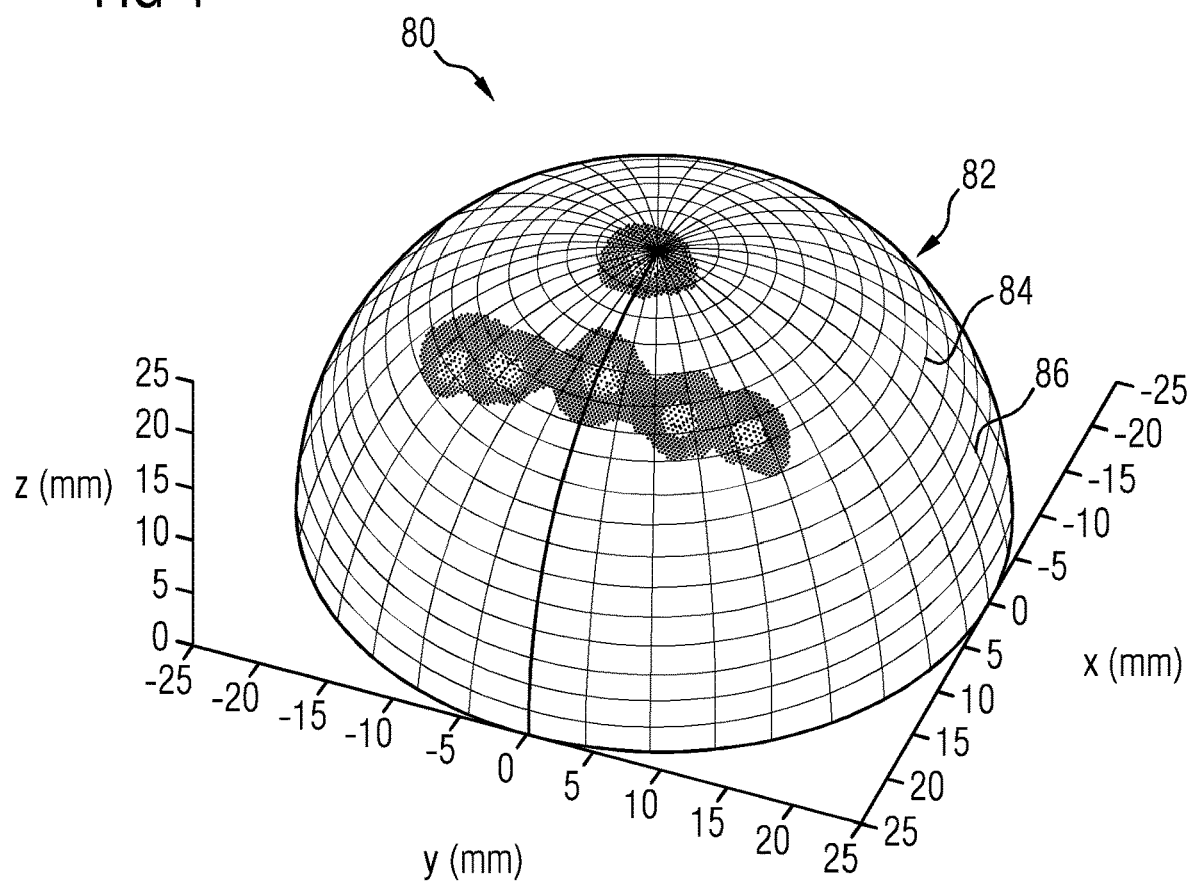
FIG. 4 illustrates a graph of maps of detected dynamic fuel force for an exemplary fuel nozzle.

FIG. 4 illustrates a graph of maps of dynamic fuel force for an exemplary fuel nozzle which may be collected using the assessment subsets illustrated in FIGS. 3a and 3b.

In FIGS. 3 and 4, the vertical axis of the graph correspond to the z direction and extends from the tip of the fuel injector nozzle 12 upwardly in the view of the graphs illustrated in FIGS. 2 and 3 and downwardly in the view of the test apparatus illustration FIG. 1. The base of the graphs corresponds to the X and Y directions.

In FIG. 3a, the position of the centroids of the spray distribution of each of six outlets of a multi-stream fuel injector 12 are illustrated with a black dots 72, 73 in the graph 70. The position of the centroid may be correlated with the expected position of the seat of the outlet in order to provide a calibration step to compensate for misalignment of the fuel injector nozzle 12, both in the vertical direction and in the angular direction.

The positions at which the force of the fuel is to be measured are equidistant from one another and positioned at a portion of a surface corresponding to a sphere S. An assessment map 74; 75 of positions at which a measurement is to be taken is built for each outlet using the intersection point of the hole's axis with the sphere surface as reference point. In FIGS. 3a and 3b, the centroid 72 for a first outlet producing a first fuel jet is positioned at a different position on the surface of the sphere than the centroid 73 for a second outlet producing a second fuel jet, for example.

An assessment map 74 for the first outlet is built up using the centroid 72 as the center point and an assessment map 75 for the second outlet is built up using the centroid 73 as the center point. The arc length between adjacent points or knots of the assessment maps 74; 75 for both outlets is the same in order than the density of the fuel distribution map measured for the two outlets in the same, as illustrated in FIG. 3b for assessment map 74, for example.

In the graph 80 of FIG. 4, a sphere 82 is illustrated, which corresponds to the positions at which the sensor 22 may be positioned when collecting data according to the assessment maps. The sphere 82 is illustrated by lines of latitude 84 and lines of longitude 86 defining the sphere 82. The head 30 of the sensor 22 was positioned at the plurality of equidistant points or knots illustrated in the assessment subsets of FIG. 3 such that the head 30 was arranged at a tangent to this sphere 82. Each of the plumes of fuel emitted from each of the six outlets has a substantially circular form as indicated in FIG. 4.

Figure 5:
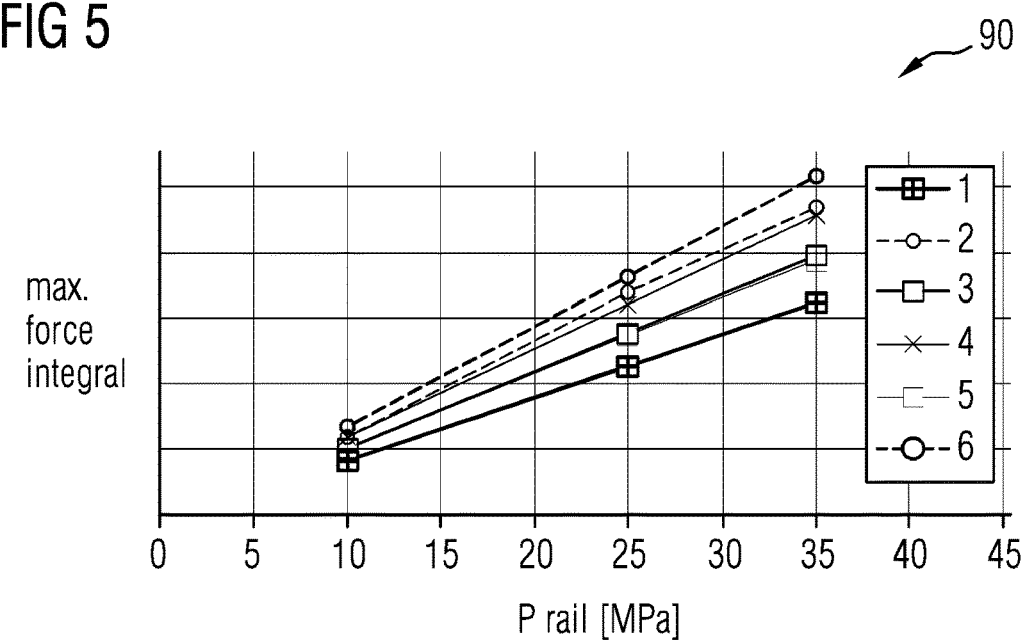
FIG. 5 illustrates a graph of the maximum force integral measured for each of six outlets for a multi-stream injector nozzle at different fuel rail pressures.

FIG. 5 illustrates a graph 90 of the maximum force integral as a function of fuel pressure of the fuel supplied to the fuel injector nozzle 12 for each of the six outlets 1 to 6. This illustrates that the difference in the force of the fuel supplied by the fuel outlets becomes larger at higher fuel pressures, for example at 35 MPa, compared to lower fuel pressures, for example 10 MPa. Consequently, the spatial distribution of the atomized fuel over a spherical surface and the force of the atomized fuel at a given distance from the fuel injector nozzle can be measured for each of the outlets such that a more detailed testing of the fuel distribution can be obtained, also over a time interval.

The invention claimed is:

1. An apparatus for testing a fuel injector nozzle, the fuel injector nozzle having a tip with at least one fuel outlet, the apparatus comprising:
   a test chamber;
   a holder configured to hold the fuel injector nozzle such that the fuel outlet of the fuel injector nozzle is within the test chamber;
   a fuel supply arrangement supplying fuel to the fuel injector nozzle;
   a sensor having a sensor surface sensing an atomized fuel spray supplied by the fuel injector nozzle through the fuel outlet, the atomized fuel spray supplied into the test chamber at a first pressure; and a movement module configured to move the sensor, wherein the movement module is configured to position the sensor surface of the sensor at a plurality of positions corresponding to a surface to a sphere having a radius R and a center point C adjustable to match a center point $c_t$ of the tip of the fuel injector nozzle or a center point $c_f$ the fuel outlet to the position C, wherein the sensor senses the atomized fuel spray that is sprayed into the test chamber at a second pressure at the plurality of positions corresponding to positions on the surface of the sphere, the second pressure being different from the first pressure.

2. The apparatus as recited in claim 1, wherein the movement module comprises a first unit positioning the sensor surface of the sensor at a tangent to the surface of the sphere, wherein the first unit comprises a first submodule for rotating the sensor around a first rotational axis and a second rotational axis that is orthogonal to the first rotational axis.

3. The apparatus as recited in claim 1, wherein the movement module further comprises a second unit for moving the sensor in three orthogonal linear directions.

4. The apparatus as recited in claim 1, wherein the movement module is configured to position the sensor surface of the sensor at a plurality of positions on the surface of the sphere corresponding to a quasi equidistant map of interrogation points.

5. The apparatus as recited in claim 1, wherein the sensor comprises a force sensor.

6. The apparatus as recited in claim 5, wherein the sensor is configured to detect a force of the atomized fuel spray at a frequency of at least 10 kHz.

7. The apparatus as recited in claim 1, wherein the fuel supply arrangement further comprises a module for adjusting a pressure of the fuel supplied to the fuel injector nozzle and/or a temperature control module for controlling a temperature of the fuel and/or of the fuel injector nozzle and/or a pressure control module for controlling a background pressure of the test chamber.

8. A method for testing a fuel injector nozzle, the method comprising:

placing a fuel injector nozzle having a tip with at least one fuel outlet into a test chamber;

spraying atomized fluid into the test chamber from the at least one fuel outlet of the fuel injector nozzle;

detecting the atomized fluid spray at a plurality of positions corresponding to positions of a surface of a sphere having a radius R and a center point C arranged at a center point $c_t$ of the tip of the fuel injector nozzle or at a center point $c_f$ of an orifice of the at least one fuel outlet;

measuring a force of a plume of atomized fuel from a first outlet of the fuel injector nozzle at a plurality of first equidistant positions corresponding to the surface of the sphere at the radius R according to a first distribution map that corresponds to a portion of the surface of the sphere at the radius R;

determining a sensed center of the plume;

comparing the sensed center of the plume to an expected center of the plume;

determining a difference between the sensed center of the plume and the expected center of the plume and, if a difference is determined between the sensed center of the plume and the expected center of the plume that is greater than a predetermined threshold value; and adjusting an orientation of the first distribution map with respect to the fuel injector nozzle such that the difference between the sensed center of the plume and the expected center of the plume is less than the predetermined threshold value.

9. The method according to claim 8, wherein the atomized fluid spray is detected using a sensor comprising a sensor surface, the sensor surface being positioned at a tangent to the surface of the sphere and wherein the plurality of positions are equidistant on the surface of the sphere.

10. The method according to claim 8, wherein a value corresponding to a parameter of the fluid spray is obtained at each position and a fuel distribution map is formed from the values.

11. The method according to claim 9, further comprising adjusting the radius R to a different value R', positioning the sensor at a plurality of equidistant positions on the surface of a sphere having a center point C and a radius R', and obtaining a value corresponding to force of the fluid spray from the at least one fuel outlet of the fuel injector nozzle at each position of a plurality of equidistant positions on the surface of the sphere with the radius R' and forming an outlet distribution map from the values.

12. The method according to claim 8, wherein an angular orientation of the first distribution map with respect to the fuel injector nozzle is adjusted such that the difference between the sensed center of the plume and the expected center of the plume is less than the predetermined threshold value.

13. The method according to claim 8, wherein the plurality of first equidistant positions are mutually spaced apart by a first arc length and the method further comprises detecting the fluid spray at a plurality of second equidistant positions corresponding to positions of a surface of the sphere at the radius R, wherein the plurality of second positions are mutually spaced apart by a second arc length which is smaller than the first arc length.

14. A method for testing a fuel injector nozzle, the method comprising:

placing a fuel injector nozzle having a tip with at least one fuel outlet into a test chamber;

spraying atomized fluid into the test chamber from the at least one fuel outlet of the fuel injector nozzle, the atomized fluid sprayed into the test chamber at a first pressure;

detecting the atomized fluid spray at a plurality of positions corresponding to positions of a surface of a sphere having a radius R and a center point C arranged at a center point $c_t$ of the tip of the fuel injector nozzle or at a center point $c_f$ of an orifice of the at least one fuel outlet, adjusting the pressure of the fluid supplied to the fuel injector nozzle to a second pressure that is different from the first pressure; and detecting the atomized fluid spray that is sprayed into the test chamber at the second pressure at a plurality of positions corresponding to positions on the surface of the sphere.

* * * * *